3,677,882

INDUSTRIAL LAMINATE SURFACED ON ONE SIDE WITH A COPPER FOIL AND ON THE OTHER SIDE WITH A WHITE PIGMENTED FILM OF ADHERABLE POLYVINYL FLUORIDE

Frederick William Jahns, Jr., Cincinnati, Ohio, assignor to General Electric Company, New York, N.Y.

No Drawing. Filed Feb. 19, 1970, Ser. No. 12,832
Int. Cl. B32b *15/08, 27/30;* H05k *1/00*
U.S. Cl. 161—189 7 Claims

ABSTRACT OF THE DISCLOSURE

An industrial laminate surfaced on one side with a copper foil and on the other side with a white pigmented film of adherable polyvinyl fluoride between which layers there are a plurality of paper layers and glass scrim cloth layers each of which have been impregnated with a punching stock thermosetting phenolic resin.

BACKGROUND OF THE INVENTION

The present invention is in the field of industrial laminates which are useful as a printed circuit for use in electrical components such as radios, television sets, computers and the like. Industrial laminates of the class surfaced with a copper foil have been made for a plurality of years. In such laminates it frequently had been made the practice to make use of a plurality of sheets of paper impregnated with punching stock thermosetting phenolic resins when the various laminae are prepared and assembled in superimposed relationship. The entire assembly is then heat and pressure consolidated to a unitary thin structure during which consolidation step the thermosetting resins in the various layers are converted to the thermoset state. The surface of the copper foil is then treated in a printing step with an etch-resistant coating where it is desired that the copper foil will not be attacked by the subsequently applied etching material which will remove the unprotected copper leaving behind the printed circuit.

FIELD OF THE INVENTION

The present application is in the field of industrial laminates surfaced with a copper foil on one of the laminates' broad surfaces and on the other broad surface with a white pigmented adherable film of polyvinyl fluoride in which the ultimate industrial laminate will find particular use in printed circuits.

DESCRIPTION OF THE PRIOR ART

The instant applicant is aware of a plurality of collateral references none of which are deemed to be anticipatory of his concept, namely, the U.S. Pat. 2,680,699, 2,694,028, 3,308,008 and 3,342,647, each of which patents are incorporated herein by reference.

SUMMARY OF THE INVENTION

An industrial laminate suitable for use as a printed circuit comprising in heat and pressure consolidated superimposed relationship:

(1) an adhesive coated copper foil bonded to
(2) a flame retardant adhesive paper sheet impregnated with a punching stock thermosetting phenolic resin,
(3) a layer of glass scrim cloth impregnated with a punching stock thermosetting phenolic resin,
(4) a weight, cotton linters, paper sheet impregnated with a punching stock thermosetting phenolic resin,
(5) a layer of glass scrim cloth impregnated with a punching stock thermosetting phenolic resin, (6) a filler, cotton linters, paper sheet impregnated with a punching stock thermosetting phenolic resin,
(7) a weight, cotton linters, paper sheet impregnated with a punching stock thermosetting phenolic resin,
(8) a filler, cotton linters, paper sheet impregnated with a punching stock thermosetting phenolic resin, and
(9) a white pigmented film of adherable polyvinyl fluoride, wherein said thermosetting resins have been converted to the thermoset state during the heat and pressure consolidation.

The cotton linters papers whether used as a weight paper sheet or as a filler paper sheet is preferably impregnated with a fire retardant punching stock thermosetting phenolic resin. In these cotton linters papers, the fibers in each of the sheets are substantially identical but the thickness of the filler sheet varies between about 0.015 inch and 0.020 inch whereas the thickness of the weight sheet varies between about 0.010 inch and 0.012 inch.

The adhesive coated copper foil is an electrolytic copper foil weighing about one ounce per square foot and being about 0.0014 inch thick which has been adhesively coated with a proprietary polyvinyl butyral type adhesive. The thickness of the copper foil is not critical and is generally dictated only by commercial availability and economics. Furthermore, the type of adhesive applied to the copper foil may be any one of a number of adhesives, a plurality of which are available commercially such as the Palmer adhesive 1161–21 commonly used for coating copper. The Palmer adhesive is supplied by Palmer Products Incorporated, Worcester, Pa.

The treated adhesive sheet which is positioned immediately below the copper foil is a cotton linters paper which contains proprietary flame retardant additives and is then treated with a punching quality or punching stock thermosetting phenolic resin to a resin content of about 52–57 percent by weight. Actually, the resin content in these treated adhesive sheets may be varied between about 40–80 percent by weight of resin solids based on the total weight of the impregnated dry paper sheet. It is preferred to use between about 56–58 percent of the resin by weight, same basis. The cotton linter paper containing the flame-retardant additives is available from a plurality of sources including the Hurlbut Paper Company's 304 FGY Paper. The flame-retardant additives are probably any of the well known flame-retardant materials such as antimony trioxide or some of the Aroclor® chlorinated hydrocarbons, a plurality of which are available from the Monsanto Chemical Company. The phenolic resin used in the adhesive sheet to which the copper foil will be directly bonded may contain either a flame-retardant punching stock thermosetting phenolic resin or a non-flame retardant punching stock thermosetting phenolic resin, but because the etching material used to treat the copper foil in converting such a surface to a printed circuit may attack the fire-retardant chemicals in the adhesive sheet thereby damaging and weakening the copper clad laminate, it is preferred that non-flame retardant punching stock thermosetting phenolic resin be used therein.

A substantial plurality of thermosetting phenolic resins are available commercially that meet the description of a punching stock thermosetting phenolic resin. Attention is directed to the U.S. Pats. 2,930,774, 3,007,827, 3,228,899 and the British Pat. 944,835; each of which patents are incorporated herein by reference. These thermosetting resins can be converted to a flame-retardant type of thermosetting phenolic resin by the addition thereto of selected quantities of certain chlorinated hydrocarbons which vary from water white mobile liquids and pale yellow oils to light amber resins and opaque crystalline solids. These chlorinated hydrocarbons are characterized by non-flammability, high dielectric strengths and resistivity, low vaporization loss, and stability toward heat, acids and alkalies. These materials are thermoplastic and nondrying. The general physical properties of a plurality of these compounds are shown in the "Handbook of Material Trade Names" by Zimmerman and Lavine, page 65 of the 1953 edition, published by the Industrial Research Service of Dover, N.H.

The treated weight sheet and the treated filler sheet have been identified in precise detail hereinabove, wherein it is indicated that they differ from one another only in their thicknesses. Each of these paper sheets in turn should be impregnated with the punching stock thermosetting phenolic resin whether flame-retardant or not and preferably those which have been modified so as to impart a flame-retardant characteristic thereto. Whether it is a weight sheet or a filler sheet these treated items will have a resin content varying between about 40% to about 80% and preferably between about 52% and 60% by weight based on the total weight of the resin impregnated dry paper.

The glass scrim used in several of the layers of the laminate of the present invention is a commercially available product and these glass scrim cloth layers may be treated with either a flame-retardant or a non-flame retardant punching stock thermosetting phenolic resin, a plurality of which are available commercially and have been described in greater detail hereinabove. The treated glass scrim cloth should be impregnated to a resin content varying between about 27% and 33% by weight based on the weight of the dried impregnated glass scrim cloth.

The white pigmented adherable decorative polyvinyl fluoride film may be printed on its exposed surface in a printing of a color different from white to produce an attractive printed white surface that is non-phenolic in appearance and has filled the needs of many customers. The white polyvinyl fluoride film surface not only is printable but preserves the desired insulation resistance (electrical property) of such printed circuits. The polyvinyl fluoride film also withstands the effective etchant solution, thermal conditions of a 260° C. solder bath and other processing conditions associated with the preparation of printed circuits. The various laminae as recited in the disclosure hereinabove are assembled in a conventional manner to produce, on heat and pressure consolidation, a laminate of 0.062" nominal thickness. Although some of the same treated materials are used in different arrangements, their location is rearranged to meet the requirement for fabricating operations of punching clean holes about 0.050" in diameter. The rearrangement is also needed to permit "scoring," partially cutting through part of the thickness in order to facilitate the snapping off of the small printed circuit boards after processing. The polyvinyl fluoride film in its white pigmented form is available commercially from a plurality of sources and its thickness is not critical but as in the instance of the copper foil the thickness is dictated by commercial availability and economics. Commercially available polyvinyl fluoride film varies between about 0.0005" to about 0.004" and preferably 0.0015". This film is available in a plurality of different colors including the white, green, blue and gold; but the white pigmented polyvinyl fluoride film is preferred. The polyvinyl fluoride film has been treated by conventional processes in order to make both sides adherable. In the process of preparing the industrial laminates of the present invention, it is generally desirable to make use of a polypropylene release film which is placed in contact with the polyvinyl fluoride film which polypropylene release film in turn is contacted by the stainless steel press plate of the laminating machine. This polypropylene release film is an unoriented polypropylene and is available in thicknesses varying between about 0.001" to about 0.006", and preferably 0.003". The actual processing conditions for the consolidation of the various laminae into the unitary structure simp;ly requires positioning the appropriate laminae in their respective positions in superimposed relationship whereupon the assembly is introduced into flatbed presses using stainless steel press plates and in normal production procedures using 1100 p.s.i. and a temperature ranging from about 155° C. to 165° C. for 35 minutes. The temperature is lowered to 40° C. before unloading. The laminate may receive post-finishing of the copper surface to clean the copper if necessary. The laminate will be trimmed to size before sale to the customer. The conventional standard size sheet of such an industrial laminate is about 36" x 96" x 0.062". This laminate can be punched warm at 60° C. to 80° C. The polypropylene film is removed from the laminate after the laminate has been removed from the press.

The laminate of the present invention is subjected to a plurality of control tests in order to determine or measure the bond of the white polyvinyl fluoride film to the laminate and to the suitability for processing were conducted. For instance, the bond of the adherable pigmented white polyvinyl fluoride film is excellent and the film breaks or tears when an attempt is made to peel it from the laminate. Solder blister resistance (260° C.) is used as a control test and as a criterion for a good bond. In addition to the bond test, the laminate is immersed in boiling water for a total of 9 hours and yet the bond is still satisfactory.

In processing, no blisters or delamination occurs between the white polyvinyl fluoride film and the remaining body of the laminate. The laminate surfaced with the white polyvinyl fluoride film is not affected by exposure to trichloroethylene vapor for 3 minutes; and finally, solvents such as methyl ethyl ketone and iso-propyl alcohol have no effect on the white polyvinyl fluoride film or on the laminate. The laminates of the present invention in addition to retaining high electrical, flame-retardant, and impact resistant properties additionally meets the need for a product that has a surface with a desirable aesthetic property. Prior to the present invention, there was no known method for producing an industrial high pressure laminate with an attractive white printable surface that is non-phenolic in appearance and which was comparable in physical electrical properties to a glass scrim reinforced NEMA FR–2 (a flame-retardant, warm punching paper base phenolic) laminate. These new laminates will be used principally for printed circuit applications.

A particularly advantageous new thermosetting phenolic resin has been developed which has outstanding properties and is the subject matter of the U.S. application having the Ser. No. 858,185, filed Sept. 15, 1969. Said application is incorporated herein by reference. The method for the preparation of a representative type of this new punching type thermosetting phenolic resin is set forth hereinbelow.

New phenolic resin

Into a suitable reaction vessel equipped with heater stirrer, reflux condenser and thermometer, there is introduced 46.4 parts of 99% phenol and 0.135 part of concentrated sulfuric acid. With constant agitation, the charge is heated to 80° C. Thereupon, 7.7 parts of monomeric styrene are charged to the reaction vessel over about a 30 minute period while holding the temperature at about 80° C. ±5° C. The charge is then heated to 160° C. in approximately 30 minutes and 21.6 parts of tung oil are added. With constant agitation, the charge is reacted for about 3 hours at 160° C. ±5° C. The reaction mass is then cooled to about 115°–120° C. and 1.07 parts of DPAPA [1] are added. The cooling is continued, and when a temperature of 90–95° C. is reached, 2.3 parts of hexamethyltetramine is added, followed by 6.9 parts of 91% paraformaldehyde with continued cooling. At 80° C.,

[1] Prepared by reacting 3 moles of the dimer of linolenic acid with 4 moles of ethylene diamine and the reaction product thus produced reacted with 2 moles of the pentanoic acid.

21.96 parts of 45% aqueous solution of formaldehyde is added. The charge is heated to reflux and is refluxed for about 27 minutes. The sample was tested for its string time value at 15 minutes and again at 27 minutes. After 15 minutes, the sample had a string time of 240–280 seconds, whereas at 27 minutes, the string time was about 150–190 seconds. Thereupon, 2.3 parts of aniline are added over a 5 minute period while continuing the refluxing for a total of 40 minutes, whereupon 0.25 part of a 1% solution in xylol of a commercially available anti-foam material is added. The steam jacket is then shut off and a light vacuum is applied so as to reflux the system gently. The condensation is allowed to flow into the receivers. The vacuum is increased as the temperature falls, while maintaining a gentle reflux until the temperature reaches about 75° C. at which point vacuum is about 17 inches of pressure, absolute. There is applied approximately 20 lbs. of steam on the jacket and the dehydration is continued at about 70–75° C. so as to remove by dehydration 14.8 parts of water. The system is cooled to about 60–65° C. with cooling water in the steam jacket, whereupon 15.8 parts of isopropanol and 7.9 parts of toluene are added. The cooling is continued and when a temperature of 50–55° C. is reached, 15.8 parts of methyl ethyl ketone are added. The system is vacuum refluxed gently until solution occurs whereupon the reaction mass in solution is cooled to room temperature, is drummed off through a filter sock into lined drums.

The process outlined in the U.S. Pat. 3,044,895 is utilized to treat paper preparatory to making a laminate from core sheets. This patent is incorporated herein by reference. In the aforementioned patent, use is made of a water soluble resin and a water insoluble resin. The water soluble resin is prepared as follows:

Water soluble resin A

Into a suitable reaction vessel equipped with thermometer, stirrer, reflux condenser and vacuum controller, there is introduced 5848 parts of a 45% aqueous solution of formaldehyde and 4850 parts of 99% phenol. While agitating the charge, 96.5 parts of triethylamine are introduced through a manhole while maintaining a light vacuum. The charge is then heated to reflux under vacuum at 70° C. in about 15–20 minutes. The vacuum reflux instrument is advanced to 75° C. and refluxing is continued at 75° C. ±1° for 120+10 minutes. The charge is cooled to 30–35° C. and is drummed off. The specification of the resin thus produced is set forth hereinbelow:

| | |
|---|---|
| ASTM solids ---------------percent-- | 71.5—73.5 |
| Water tolerance ----------------do---- | 700—1200 |
| pH at 25° C. -------------------------- | 7.9±0.1 |
| Specific gravity ------------------------ | 1.210±0.010 |
| Viscosity (No. 2 spindle, 20 r.p.m.) -cps-- | 275±25 |
| Gel time at 136° C. ----------minutes-- | 10.5±1 |

When the unoriented polypropylene release sheet is omitted, blisters and delamination will occur between the white polyvinyl fluoride film and the treated filler sheet. Furthermore, a finishing operation is needed to restore the printability of the white polyvinyl fluoride surface if the laminate is pressed against plates directly which plates have a residue of release agent. When an ordinary white polyvinyl chloride film is used in the place of the white polyvinyl fluoride film, the polyvinyl chloride film did not resist exposure to trichloroethylene vapor for 3 minutes and the solder blister resistance was too low (about 2 seconds).

When a white pigmented paper impregnated with a thermosetting melamine-formaldehyde resin was used in the place of a white polyvinyl fluoride film, the pressed laminate was warped excessively and could not be straightened. The insulation resistance was also too low in this situation (less than 100 megohms) and the white melamine surface was too brittle for punching.

When a pigmented white paper impregnated with a thermosetting phenolic resin is used in the place of the white polyvinyl fluoride film, the insulation resistance again was too low; namely, 2,000 to 3,000 megohms, and the surface was tan in appearance.

A suitable resin composition to be used in impregnating the white sheets and filler sheets is a mixture of the new phenolic resin hereinabove together with the water-soluble Resin A and appropriate additives such as Aroclor 5460, Aroclor 1262 and suitable commercially available plasticizers and as the solvent a mixture of methyl ethyl ketone and toluene.

I claim:

1. An industrial laminate suitable for use as a printed circuit comprising in heat and pressure consolidated superimposed relationship:

(1) an adhesive coated copper foil bonded to,
(2) a flame retardant adhesive paper sheet impregnated with a punching stock thermosetting phenolic resin,
(3) a layer of glass scrim cloth impregnated with a punching stock thermosetting phenolic resin,
(4) a weight, cotton linters, paper sheet impregnated with a punching stock thermosetting phenolic resin,
(5) a layer of glass scrim cloth impregnated with a punching stock thermosetting phenolic resin,
(6) a filler, cotton linters, paper sheet impregnated with a punching stock thermosetting phenolic resin,
(7) a weight, cotton linters, paper sheet impregnated with a punching stock thermosetting phenolic resin,
(8) a filler, cotton linters, paper sheet impregnated with a punching stock thermosetting phenolic resin, and
(9) a white pigmented film of adherable polyvinyl fluoride, wherein said thermosetting resins have been converted to the thermoset state during the heat and pressure consolidation.

2. A laminate according to claim 1 in which the weight, paper sheets and the filler, paper sheets are impregnated with a fire retardant punching stock thermosetting phenolic resin.

3. A laminate according to claim 1 in which the flame retardant adhesive paper sheet is impregnated with a punching stock, non-flame retardant thermosetting phenolic resin.

4. A laminate according to claim 1 in which the film of polyvinyl fluoride has a printed message thereon in a color other than white.

5. A laminate according to claim 1 in which some of the copper foil has been etched away so as to provide a printed circuit.

6. A laminate according to claim 5 in which the film of polyvinyl fluoride has a printed message thereon in a color other than white.

7. A laminate according to claim 6 in which the printed message on the polyvinyl fluoride film is at least in part in register with the copper foil printed circuit on the reverse side of said laminate.

References Cited

UNITED STATES PATENTS 3,581,779 6/1971 Sylvia ------------ 161—189 X

HAROLD ANSHER, Primary Examiner

U.S. Cl. X.R.

161—198, 215, 220, 264, 403, Digest 4, Digest 7